United States Patent [19]

Gloster et al.

[11] 3,810,542

[45] May 14, 1974

[54] PROCESS FOR REMOVING CHROMIUM FROM COOLING TOWER BLOWDOWN STREAMS

[75] Inventors: Arthur Gloster, Highland Lakes; Harry G. Bocckino, Somerville, both of N.J.

[73] Assignee: Texas Gulf, Inc., New York, N.Y.

[22] Filed: Nov. 26, 1971

[21] Appl. No.: 202,379

[52] U.S. Cl. .............................................. 210/50
[51] Int. Cl. ............................................. C02c 5/04
[58] Field of Search............................ 210/47, 48, 50

[56] References Cited
UNITED STATES PATENTS

| | | | |
|---|---|---|---|
| 3,325,401 | 6/1967 | Lancy | 210/50 X |
| 3,575,853 | 4/1971 | Gaughan et al. | 210/50 X |
| 2,863,732 | 12/1958 | Bowers et al. | 210/50 X |
| 2,310,187 | 2/1943 | Axelrod et al. | 210/50 X |

OTHER PUBLICATIONS

Hoover, C. R., et al., "Disposal of Waste Liquors from Chromium Plating," Ind. Eng. Chem., 33, 131 (1941).

Primary Examiner—Samih N. Zaharna
Assistant Examiner—Thomas G. Wyse

[57] ABSTRACT

This disclosure is directed to a procedure for combining the streams from a cooling tower and an acid plant scrubbing tower to reduce the pollution problems of these industrial waste waters. The cooling tower stream is characterized by the presence of chromium products in which the chromium is in the hexavalent state, such as chromic acid or a chromate salt which are common corrosion inhibitors in cooling waters. The acid plant scrubbing tower is characterized by an acidic component such as sulphur dioxide dissolved in water. By combining these two streams the hexavalent chromium under acidic conditions is converted to trivalent chromium. The combined streams are then neutralized to precipitate chromium hydroxide and other compounds which are undesirable in the effluent. After settling out the chromium hydroxide and other compounds the waste stream may be discharged without presenting a pollution problem.

4 Claims, 3 Drawing Figures

PROCESS FOR REMOVING CHROMIUM FROM COOLING TOWER BLOWDOWN STREAMS

BACKGROUND

Water cooling towers are used in many applications in which it is necessary to remove large quantities of heat at temperatures somewhat above ambient wet bulb temperatures. The use of the water cooling tower conserves the use of water by permitting it to be recirculated for reuse. The recirculated water removes heat from a process stream. The hot water is returned to the water cooling tower at a temperature higher than it leaves the tower. Heat is removed from the water by evaporation of a portion of it into the air. Approximately 1,000 BTUs are removed for each pound of water evaporated. This evaporation of the water must be replaced by makeup water which carries dissolved salts into the cooling water circuit. These salts could build up to the point where they exceed their solubility in water and deposit on the heat exchangers, cooling tower components, etc. It is normal procedure to control the buildup of solids by purging a portion of the recirculating water; this purged stream is termed the "blowdown."

The water in a cooling tower system must be treated to reduce scale formation and/or corrosion. A common effective treatment includes the addition of chromates either alone or in combination with other compounds. However, chromium is toxic. It must be removed from the purge stream before the latter can be discharged into a river, or other stream. One method of removing chromium is to adjust the pH to 2 or 2.5, to add ferrous sulphate or sulphur dioxide which reduces the hexavalent chromium to trivalent chromium, to add an alkali such as lime to obtain a pH of about 8 which causes chromium hydroxide to precipitate and to remove the chromium hydroxide by settling. At a pH of about 10, phosphorous and zinc as well as most other heavy metals that may be present are removed.

Metallic sulphides are roasted in air either to remove combined sulphur to permit the metals to be recovered by subsequent processing or to produce sulphur dioxide. Regardless of the purpose of the roasting operation, it is undesirable to liberate large quantities of sulphur dioxide into the atmosphere. Commonly, the sulphur dioxide from the roaster gases is used to produce sulphuric acid, liquid sulphur dioxide or elemental sulphur. In each of these operations, the roaster gases must be purified to make them suitable for further processing.

Normally the roaster gases are cooled, for example, by flowing through a waste heat boiler, dust is removed in cyclones or an electrostatic precipitator, and additional dust and fumes are removed by scrubbing the gases with an aqueous solution in a gas scrubbing tower. The aqueous solution must be purged to prevent the build up of undesirable impurities, such as chlorides or fluorides.

It is an object of this invention to provide an improved process for the treatment of cooling tower blowdown to remove toxic chromium products therefrom. A further object of this invention is to provide a process for removing chromium products from cooling tower blowdown and reducing the amount of fresh water needed for scrubbing roaster gases.

The manner of accomplishing these and other objects in accordance with the present invention is set forth in the following detailed disclosure.

DESCRIPTION OF INVENTION

The present invention is directed to removing chromium from cooling tower blowdown which includes the step of passing the blowdown through an acid plant scrubber or combining the blowdown with the effluent from a conventionally operated acid plant scrubber. The resultant stream is then neutralized and the chromium products are removed by settling.

In each of the figures, like numerals refer to similar flow streams and equipment.

Figure 1:
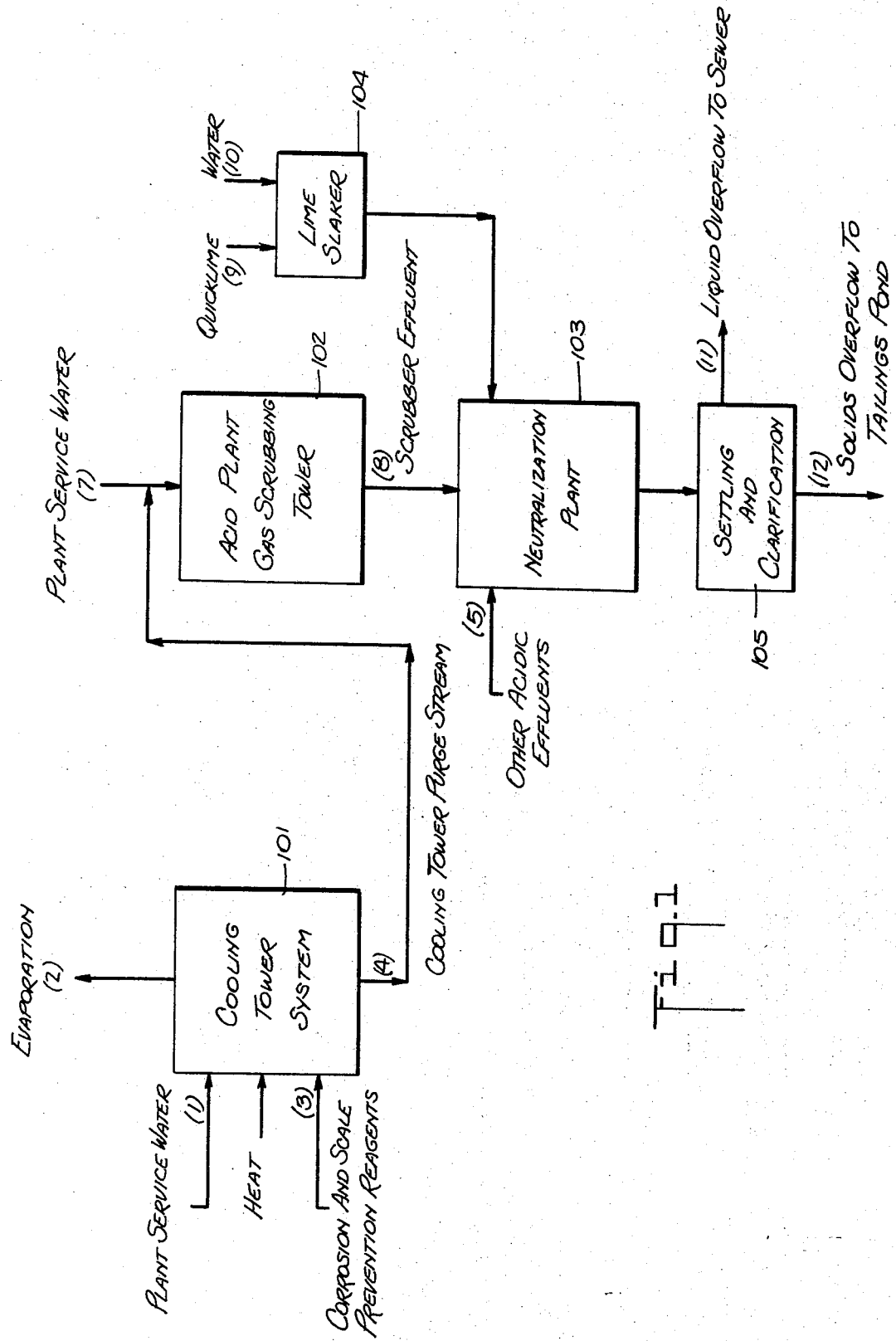
FIG. 1 is a flow diagram for the process of this invention.

FIG. 1 discloses the preferred embodiment of the present invention. A cooling tower system of conventional design, 101, is fed with plant service water 1 which circulates through the system and passes out by evaporation 2. Corrosion and scale prevention reagents 3 are added to the system as necessary in accordance with known techniques. In the process of the present invention, one of such reagents is a chromium compound which must eventually be removed from the process stream prior to discharge. As the concentration of salts increases in the cooling tower water a portion of the water must be discharged and replaced by fresh water. This discharge, or blowdown, is identified as the cooling tower purge stream 4.

The acid plant gas scrubbing tower, 102, is used for cleaning gases containing sulphur dioxide. Conventionally this is carried out by contacting the gases with plant service water (7) in accordance with known techniques. In the present invention the cooling tower purge stream is added to, and at least partially replaces, the plant service water used to contact the acid plant gas. The scrubber effluent (8) from the acid plant gas scrubbing tower is passed into a neutralization plant, 103. The neutralization plant, which is of conventional design for this purpose, is also the treating means for other acidic effluents (5) which are waste streams from many processes such as roasting operations. Quicklime (9) and water (10) are reacted in a lime slaker, 104, and fed to the neutralization plant. The neutralization plant may comprise a series of staged vessels with both acid streams (5) and (8) and lime entering a first vessel and the combined streams then passing into one or more vessels, where more lime can be added for precise pH control.

The aforementioned operations may be carried out on a batch, semicontinuous or continuous basis in which the scrubber effluents and other acidic effluents are at a pH below 4, preferably at or below 2-2.5, for example, a pH of 1. If additional acidity is required to reach the low pH, the acid effluents (5) may be used to assist in the acidification of the scrubber effluent (8) by causing stream (5) to mix with stream (8) before entering the neutralization plant. The quicklime solution is used to raise the pH above 7, preferably about 8 or above.

The stream from the neutralization plant is then passed through a settling and clarification vessel, 105. The liquid overflow (11) from the settling and clarification tank may be discharged to a sewer since the liquid overflow is virtually free of the chromium pollutants initially added to the cooling tower system as a corrosion and scale prevention agent. These chromium products are passed as a solids underflow (12) from the settling and clarification tank to a tailings pond.

Figure 2:
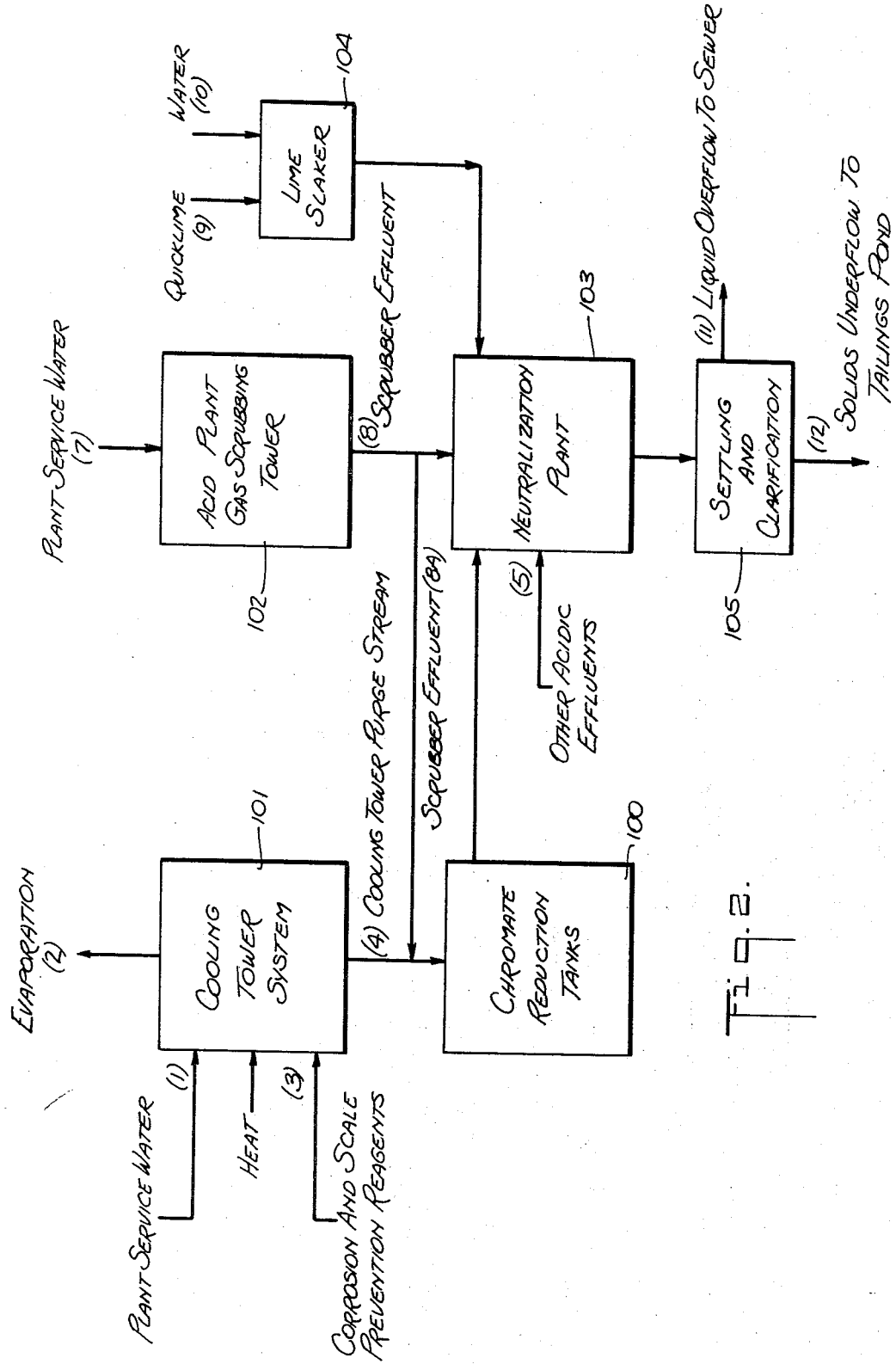
FIG. 2 is a flow diagram of an alternative embodiment of this invention.

FIG. 2 shows a system similar in many respects to the system of FIG. 1. However, the cooling tower purge stream (4) is passed to a chromate reduction tank, 100. The scrubber effluent (8) is at least partially (8A) passed into the chromate reduction tank. A sufficient amount of scrubber effluent is added to the chromate reduction tank to bring the solution therein to a pH below 4, preferably at or below 2–2.5. The solution from the chromate reduction tank is then passed into the neutralization plant vessel and the solution therein is neutralized to a pH above 7 in the manner described above.

Figure 3:
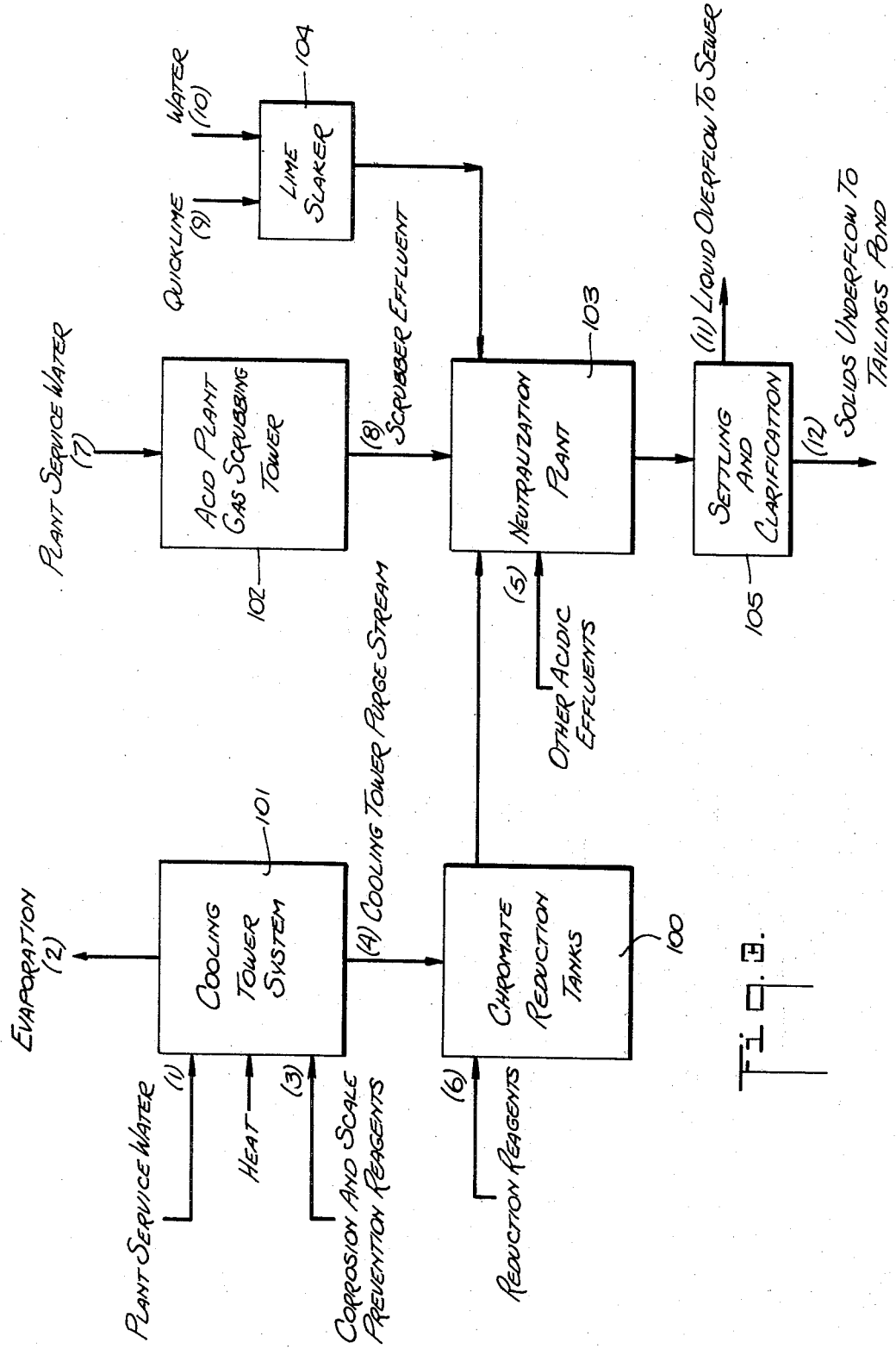
FIG. 3 is a flow diagram of a system which does not embody the invention of this application, and as discussed in further detail below will be used for purposes of comparison to show the advantages of the present invention.

FIG. 3 shows a system in which the cooling tower purge stream is treated in the chromate reduction tanks with reduction reagents (6) of conventional composition. The scrubber effluent is not directly mixed with the cooling tower purge system, although both streams eventually merge in the neutralization plant.

In a roasting operation where the roaster calcines are used to produce metallic zinc and the roaster gases are used to produce sulphuric acid, it is possible in accordance with this invention to use a common purge stream in order to reduce the total effluent from the plant while at the same time utilizing the normal conditions in the gas scrubbing tower to reduce the hexavalent chromium to trivalent chromium.

For example, in a plant producing about 700 tons per day of sulphuric acid from sulphur dioxide gases leaving a zinc sulphide roaster it was desirable to purge the gas scrubbing tower to maintain the chloride content at less than 100 p.p.m. This required a purge rate of approximately 150 g.p.m.

A water cooling tower was used at the plant to cool the water used to remove heat in the sulphuric acid coolers. This cooling tower required a purge rate of approximately 100 g.p.m. to keep the dissolved solids below the desired limit. In passing the 100 g.p.m. of cooling tower purge through the gas scrubbing tower, as in FIG. 1, a saving of 100 g.p.m. of water would be realized and a corresponding reduction in plant effluent would be realized. Furthermore, it would not be necessary to use acid to separately reduce the pH of the cooling tower stream as in FIG. 3, stream (6), and the lime equivalent of the acid would not be required for final neutralization. The acid which is normally contained in the gas scrubbing tower liquor is adequate to adjust the pH, which must be lower than pH 4, preferably at or below pH 2 to 2.5 in order to permit the dissolved $SO_2$, also normally in the gas scrubbing tower liquor, to reduce the hexavalent chromium to trivalent chromium.

Finally, it is only necessary to add alkali to the combined 150 g.p.m. stream to neutralize the excess acidity and adjust the pH to precipitate the chromium hydroxide instead of neutralizing the separate 100 g.p.m. and 150 g.p.m. streams. The savings in chemicals costs are appreciable.

Laboratory tests were made which show the advantages of this method. A synthetic solution was made which included the combined impurities of the water cooling tower purge and the gas scrubbing tower accumulation. This solution was made to the following chemical analysis:

| | |
|---|---|
| Zn | 1 gpl (grams/liter) |
| Na | 0.14 gpl |
| Mg | 0.14 gpl |
| Mn | 0.13 gpl |
| $H_2SO_4$ | 1 gpl |
| As | 55 p.p.m. |
| Cd | 8 p.p.m. |
| Fe | 25 p.p.m. |
| Pb | 4 p.p.m. |
| Cu | 1 p.p.m. |
| Hg | 1 p.p.m. |
| Se | 6 p.p.m. |
| Te | 1 p.p.m. |
| Cl | 86 p.p.m. |
| F | 20 p.p.m. |
| P | 5 p.p.m. introduced as polyphosphate (Calgon) |
| P | 0.25 p.p.m. introuduced as phosphonate (Calgon CL-77) |
| $CrO_4$ | 6 p.p.m. introduced as $Na_2Cr_2O_7 \cdot 2H_2O$ |

The pH of the solution was about 2.0. Sulphur dioxide gas was bubbled through the solution in order to reduce the hexavalent chromium to trivalent chromium. Because the purge stream from the gas scrubbing tower is neutralized in a full size plant after mixing with another more acidic effluent stream, the reduced solution was acidified to 10 gpl $H_2SO_4$.

The combined solution was then neutralized with hydrated lime in two agitated tanks operating in series. The resulting slurry was thickened and clarified. The analysis of the clarified solution in three neutralization tests was as follows:

| Example No. | | 1 | 2 | 3 |
|---|---|---|---|---|
| End pH | | 10.0 | 10.8 | 10.2 |
| Zn | p.p.m. | 0.02 | 0.12 | 0.12 |
| Mg | p.p.m. | 78 | 0.87 | 142 |
| Mn | p.p.m. | 0.12 | 0.05 | 0.10 |
| Pb | p.p.m. | 0.17 | 0.17 | 0.16 |
| Cu | p.p.m. | 0.02 | 0.06 | 0.02 |
| Hg | p.p.m. | 0.0019 | 0.0020 | 0.0042 |
| Se | p.p.m. | 0.66 | 0.07 | 0.41 |
| Cl | p.p.m. | 85 | 90 | 84 |
| As | p.p.m. | 2 | 3 | 19 |
| Cd | p.p.m. | <0.0005 | <0.005 | <0.005 |
| Fe | p.p.m. | <0.2 | <0.2 | <0.2 |
| Te | p.p.m. | <0.05 | <0.05 | <0.05 |
| Fl | p.p.m. | 5 | 5 | 5 |
| P (total) | p.p.m. | 0.1 | 0.02 | 0.03 |
| Cr (total) | p.p.m. | <0.013 | <0.013 | <0.013 |
| $SO_4$ | p.p.m. | 2040 | 1670 | 2200 |

The neutralizing was effective in removing undesirable components. The chromium ion could not have been effectively removed unless it were in the trivalent state.

A material balance for each of the processes of FIGS. 1 through 3 is as follows:

| Stream No. | | Flow Scheme (Figures) | | |
|---|---|---|---|---|
| | | 1 | 2 | 3 |
| 1 | Total Flow–Tons/Day | 3,000 | 3,000 | 3,000 |
| 1 | Dissolved Solids–Tons/Day | 0.18 | 0.18 | 0.18 |
| 1 | Phosphate Equivalent of Sodium Polyphosphate–Lbs. Phosphate Equivalent/Day | 9.2 | 9.2 | 9.2 |
| 2 | Total Flow–Tons/Day | 2,500 | 2,500 | 2,500 |
| 3 | Organic Zinc–Lbs. Zinc/Day | 2.4 | 2.4 | 2.4 |
| 3 | Chromate Ion–Lbs. Chromate/Day | 14.4 | 14.4 | 14.4 |
| 3 | Phosphonate–Lbs. Phosphate Equivalent/Day | 1.86 | 1.86 | 1.86 |
| 4 | Total Flow–Tons/Day | 600 | 600 | 600 |
| 4 | –Gallons/Minute | 100 | 100 | 100 |
| 4 | Dissolved Solids–Tons/Day | 0.2 | 0.2 | 0.2 |
| 5 | Total Flow–Tons/Day | 243 | 243 | 243 |
| 5 | –Gallons/Minute | 37 | 37 | 37 |
| 5 | Sulphate to be Reacted–Tons/Day | 27.8 | 27.8 | 27.8 |
| 6 | Sulphuric Acid–Lbs./Day | 0 | 0 | 450 |
| 6 | Sodium Meta Bisulphite–Lbs./Day | 0 | 0 | 100 |
| 7 | Total Flow–Tons/Day | 300 | 900 | 900 |
| 7 | –Gallons/Minute | 50 | 150 | 150 |
| 7 | Dissolved Solids–Tons/Day | 0.02 | 0.06 | 0.06 |
| 7 | Polyphosphate–Lbs. Phosphate Equivalent/Day | 0.9 | 2.8 | 2.8 |
| 8 | Total Flow–Tons/Day | 900 | 900 | 900 |
| 8 | –Gallons/Minute | 150 | 150** | 150 |
| 8 | Sulphuric Acid–Tons/Day | 2 | 2 | 2 |
| 8 | Sulphuric Dioxide–Tons/Day | 0.45 | 0.45 | 0.45 |
| 8 | Heavy Metal Content–Lbs./Day | 107 | 107 | 107 |
| 9 | Quicklime–Tons/Day | 19.1 | 19.1 | 19.28 |
| 10 | Water–Tons/Day | 134 | 134 | 135 |
| 11 | Total Flow–Tons/Day | 1,109 | 1,709 | 1,710 |
| 11 | –Gallons/Minute | 285 | 285 | 285 |
| 11 | Dissolved Solids*–Tons/Day | 3.1 | 4.6 | 4.6 |
| 11 | Total Zinc–Lbs. Zinc/Day | <0.2 | <0.3 | <0.3 |
| 11 | Total Chromium–Lbs. Chromium/Day | <0.044 | <0.068 | <0.068 |
| 11 | Total Phosphorous–Lbs. Phosphate Equivalent/Day | 0.44 | 0.68 | 0.68 |
| 11 | Sulphur Dioxide–Lbs./Day | <22 | <34 | <34 |
| 11 | Heavy Metals–Lbs./Day | <2.5 | <3.8 | <3.8 |
| 12 | Total Flow–Tons/Day | 187 | 187 | 187 |
| 12 | Solids Content–Tons/Day | 56 | 56 | 56 |

*Mostly Calcium Sulphate at this Point.
**The scrubber effluent is directed into the chromate reduction tanks.

As can be seen from the above data for the system of FIG. 1, the liquor circulating in a gas scrubbing tower system which is used to purify sulphur dioxide gases can effectively reduce hexavalent chromium in a cooling tower purge stream while additionally permitting the water cooling tower purge to remove undesirable components from the gas scrubbing tower system. This results in a reduction of total effluent, plus a savings in water and chemicals, in contrast to the prior art wherein the purge streams were separately treated. In the system of FIG. 2 the acidity and reducing chemicals in the scrubber effluent are sufficient to replace those chemicals which otherwise would have to be added in the chromate reduction tanks.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

We claim:

1. The method of reducing the total effluent from a plant comprising an acid plant cooling tower system and sulphur dioxide scrubbing tower which comprises passing the purge stream from said cooling tower system through said sulphur dioxide scrubbing tower, in which the purge stream contains hexavalent chromium which is converted to trivalent chromium by contact with the sulphur dioxide in the acid plant sulphur dioxide scrubbing tower, the resultant stream containing trivalent chromium is mixed with an alkali to raise its pH above about 8 to precipitate chromium hydroxide, and the precipitates are removed therefrom.

2. The method of claim 1 in which said purge stream contains phosphorous and heavy metal contaminants, and the resultant stream from the sulphur dioxide scrubbing tower is mixed with an alkali to raise its pH to about 10 to precipitate contaminants.

3. The method of claim 1 in which the acidity of the solution in said scrubbing tower is maintained below a pH of 4.

4. A method of reducing undesirable chromium components from a plant comprising a water cooling tower system and an acid plant sulphur dioxide scrubbing tower which comprises mixing the water cooling tower blowdown stream which contains hexavalent chromium with the aqueous effluent stream from said acid plant sulphur dioxide scrubbing tower which contains dissolved sulphur dioxide to convert said chromium to trivalent chromium and mixing the resultant stream containing trivalent chromium with an alkali to raise its pH above about 8 to precipitate chromium hydroxide and removing the precipitates therefrom.

* * * * *

UNITED STATES PATENT OFFICE
CERTIFICATE OF CORRECTION

Patent No. 3,810,542      Dated May 14, 1974

Inventor(s) Arthur Gloster and Harry G. Bocckino

It is certified that error appears in the above-identified patent and that said Letters Patent are hereby corrected as shown below:

In the heading on the first page, line 7, change the assignee "Texas Gulf, Inc." to -- Texasgulf Inc. -- .

Signed and sealed this 8th day of October 1974.

(SEAL)
Attest:

McCOY M. GIBSON JR.
Attesting Officer

C. MARSHALL DANN
Commissioner of Patents